US010210716B2

(12) United States Patent
Hughes (10) Patent No.: US 10,210,716 B2
(45) Date of Patent: Feb. 19, 2019

(54) COMMUNICATIONS SYSTEM FACILITATING CASH TRANSFER

(71) Applicant: D'Ontra Hughes, Santa Monica, CA (US)

(72) Inventor: D'Ontra Hughes, Santa Monica, CA (US)

( * ) Notice: Subject to any disclaimer, the term of this patent is extended or adjusted under 35 U.S.C. 154(b) by 0 days.

(21) Appl. No.: 14/957,513

(22) Filed: Dec. 2, 2015

(65) Prior Publication Data

US 2017/0162004 A1 Jun. 8, 2017

(51) Int. Cl.
*G07F 19/00* (2006.01)
*G07F 7/10* (2006.01)
*G06Q 20/32* (2012.01)
*G06Q 20/36* (2012.01)

(52) U.S. Cl.
CPC ....... *G07F 19/203* (2013.01); *G06Q 20/3223* (2013.01); *G06Q 20/3226* (2013.01); *G06Q 20/3674* (2013.01); *G07F 7/1025* (2013.01)

(58) Field of Classification Search
USPC ......................................................... 235/379
See application file for complete search history.

(56) References Cited

U.S. PATENT DOCUMENTS

2015/0254699 A1* 9/2015 Bondesen .......... G06Q 30/0215
705/14.17
2015/0312041 A1* 10/2015 Choi ..................... H04L 9/3231
713/175

* cited by examiner

*Primary Examiner* — Michael G Lee
*Assistant Examiner* — David Tardif
(74) *Attorney, Agent, or Firm* — Continuum Law; Robert P. Cogan (57) ABSTRACT

A user employs a secure sign-in process via a portable device such as a smartphone to enter an app loaded into the smartphone. The user enters a personal identification number (PIN) in order to access a financial network via the app in order to request cash to be dispensed from a remote cash dispensing location such as a merchant. The network coordinates the functions of recognizing the user's requirements, keeping real-time information of participation and of amounts available from merchants, and settling commercial transactions via a clearinghouse. The user is informed of locations of merchants within a preselected distance, and selects a merchant. The system provides the merchant authentication criteria and the user provides identification information for comparison to the criteria. Authentication to the network is done without furnishing a credit card. When authorization is granted, a user is only granted a one-time token for access. This structure facilitates PCI compliance.

20 Claims, 11 Drawing Sheets

COMMUNICATIONS SYSTEM FACILITATING CASH TRANSFER

BACKGROUND

Field

The present subject matter relates to a method and system for communications between establishments to provide for cash dispensing outside of an electronic funds transfer network.

Background

At the present time, the predominant mechanism for a user to obtain cash from the user's account outside of a bank is the automatic teller machine (ATM). Using an ATM to obtain cash presets a number of requirements to both banks and users.

A user must find an ATM location in order to receive cash. ATM networks are often not readily accessible by a user. Many ATMs are located at outdoor, on-street locations. Banks are aware of robbers victimizing users of ATMs. Consequently, banks provide safety instructions for users of ATMs. The user has limited ability to select a place at which to receive cash. ATM card data is subject to theft by use of "skimmers," which devices are surreptitiously fixed to ATM card readers. Skimmers allow capture of information on a magnetic stripe on an ATM card for use in unauthorized transactions.

In order to be able to dispense cash at more than one bank, a bank must belong to an electronic funds transfer (EFT) network. Electronic banking, also known as electronic funds transfer (EFT), uses computer and electronic technology in place of checks and other paper transactions. EFTs are initiated through devices such as cards or codes that let authorized users access an account. Many financial institutions use ATM or debit cards and Personal Identification Numbers (PINs) for this purpose. Further, a non-user financial institution must belong to an ATM Network that the user's financial institution also belongs to. An ATM Network permits transactions between independent financial institutions. ATM Networks include such groups as NYCE, Pulse, and Cirrus. The Electronic Fund Transfer Act (EFTA), 15 USC 1693 et seq. of 1978 is intended to protect individual consumers engaging in EFTs. EFT services include transfers through automated teller machines, point-of-sale terminals, automated clearinghouse systems, remote banking programs, and bill-payment plans using recurring transfers. The Federal Reserve Board controls EFTA through regulations. The entity that issues the cash must operate in a heavily regulated environment.

Proprietors of retail establishments cannot operate their own EFT systems. Many establishments require payment in cash. In order to provide a customer with cash to spend in the establishment, the establishment must direct a user to an ATM. The proprietor can direct a user to an off-site ATM and hope that the user will be willing to go to the off-site ATM and then return to the establishment. Alternatively, the establishment may provide floor space to an ATM owner. The establishment may receive compensation for use of the space. However, the establishment generally must pay more for leasing the ATM, insurance, and electricity costs. If a skimmer is attached to the ATM, ill will that is generated will be attributed to the establishment and not to the financial institution.

Institutions charge fees for the use of ATMs. Generally, the user's financial institution will charge the lowest fee. Non-user ATMs and financial institutions generally charge significantly higher fees. Additionally, the nonuser financial institution must belong to an EFT network to which the user financial network belongs. Over recent years, fees have been escalating.

Fee-free ATMs are relatively rare. One fee-free ATM network, named SUM, has approximately 5,100 ATMs in the United States. In contrast, according to the National ATM Council, there were approximately 425,000 ATMs in the United States as of 2010. Banks in the SUM Network may still assess charges at non-user ATMs. The SUM ATMs require a user to watch an advertisement in order to be able to conduct a transaction, spoiling the speed and simplicity of a normal ATM transaction.

Essential elements of EFT are PCI compliance and KYC compliance. PCI is the common initialization for the Payment Card Industry (PCI) Data Security Standard. PCI standards are promulgated by the PCI Security Standards Council, LLC of Wakefield, Mass. PCI compliance relates to protection of customers' credit card data and protection from unauthorized use and identity theft. It is highly desirable to have a system in which bank account verification is performed but in which credit card data will never touch servers processing a transaction. KYC compliance relates to knowing the type of business each merchant conducts. One purpose of KYC compliance is to prevent facilitating money laundering or many other illegal activities. EFT systems are generally not designed to inherently facilitate PCI and KYC compliance.

Systems in the prior art for dispensing cash or otherwise remotely providing cash value still retain a number of drawbacks.

U.S. Pat. No. 8,851,366 discloses an online money transfer service operated by a bank or a merchant. A sender enters authentication information and money transfer details into a portal. A recipient's bank may issue credit, a check, or cash. This service is restricted to interbank transfers. It cannot dispense cash from other than a recipient's bank. The service does not dispense cash to a user originating the transaction.

U.S. Pat. No. 8,762,274 discloses a currency dispense and control system for securely dispensing paper currency independent of a standard ATM EFT network. While use of an EFT network may be avoided, ATM hardware or the like is still required. A user does not have the option to select one of a plurality of dispense locations.

U.S. Pat. No. 9,171,303 discloses a cash advance method in which a customer initiates a cash access transaction with a financial card via a cash access system and the customer receives authorization or denial. The customer provides identification and the financial card to a cashier or attendant. The cashier or attendant validates the customer's identity, retrieves the transaction information, and completes the cash advance application. The application prints a non-negotiable instrument. A central server records the transaction and generates an automated clearinghouse (ACH) file and electronically transmits the ACH file to a designated financial institution. Cash requested in the cash access transaction is disbursed to the customer at a cash-dispensing kiosk or the like. Bank participation is required at both ends of the transaction. The merchant cannot control its own hours and amounts it will dispense. The system is primarily intended for disbursing cash at a gaming table.

U.S. Pat. No. 9,010,629 discloses a system in which a card-actuated automated banking machine includes transaction function devices such as a card reader, a printer, a bill dispenser, a display, a check imaging device, and at least one processor. The machine is operative to receive a check and certification data and to dispense cash in exchange for the check. The person presenting the check does not provide user-identifying inputs through input devices of the machine. The system uses a mobile phone to communicate with the banking machine. However, the user is not enabled to select a remote location at which to receive cash. The mobile phone is only used to replace an ATM card in order to initiate a transaction.

U.S. Patent Application Publication No. 20130073365 discloses a system in which a customer uses a wireless device to exchange information comprising codes and identifiers with a merchant's purchase information indicative of goods and prices and the customer's identity. While there is contact via a wireless device, no cash is dispensed. The customer must select a merchant before beginning to use the method.

U.S. Patent Application Publication No. 20120245987 discloses a gift card transaction where a recipient's own account is credited with an amount to be used at a seller. A gift card is not used. The gift card operates via the recipient's own credit/debit card. If a qualifying purchase has been initiated at a merchant location, a processor applies an amount of money associated with the purchase. The requirement of an initial interchange with a bank is removed from the process, i.e., a bank used by a gift card issuer. However, no cash is dispensed.

There is a need for a system in which secure cash dispensing transactions can be initiated outside of an EFT system and a system which provides security, convenience, and flexibility in meeting a user's needs. Additionally, there is a need for merchants to be able to dispense cash securely and with low risk while avoiding the drawbacks of maintaining an on-site ATM.

SUMMARY

Briefly stated, in accordance with the present subject matter, a user communicates via a portable interactive device with a network. A secure sign-in process via a portable device such as a smartphone includes access to an app loaded into the smartphone. The user enters a personal identification number (PIN) in order to access a financial network via the app in order to request cash to be dispensed from a remote cash dispensing location such as a merchant. The network coordinates the functions of recognizing the user's requirements, keeping real-time information of participation and of amounts available from merchants, and settling commercial transactions via a clearinghouse. The user is informed of locations of merchants within a preselected distance, and selects a merchant. The system provides the merchant authentication criteria and the user provides identification information for comparison to the criteria. The clearinghouse may be a payment system and need not be an EFT network. Authentication to the network is done without furnishing a credit card number or account number. When authorization is granted, a user is only granted a one-time token for access. This structure facilitates PCI compliance.

BRIEF DESCRIPTION OF THE DRAWINGS

The present subject matter may be further understood by reference to the following description taken in connection with the following drawings.

DETAILED DESCRIPTION

Figure 1:
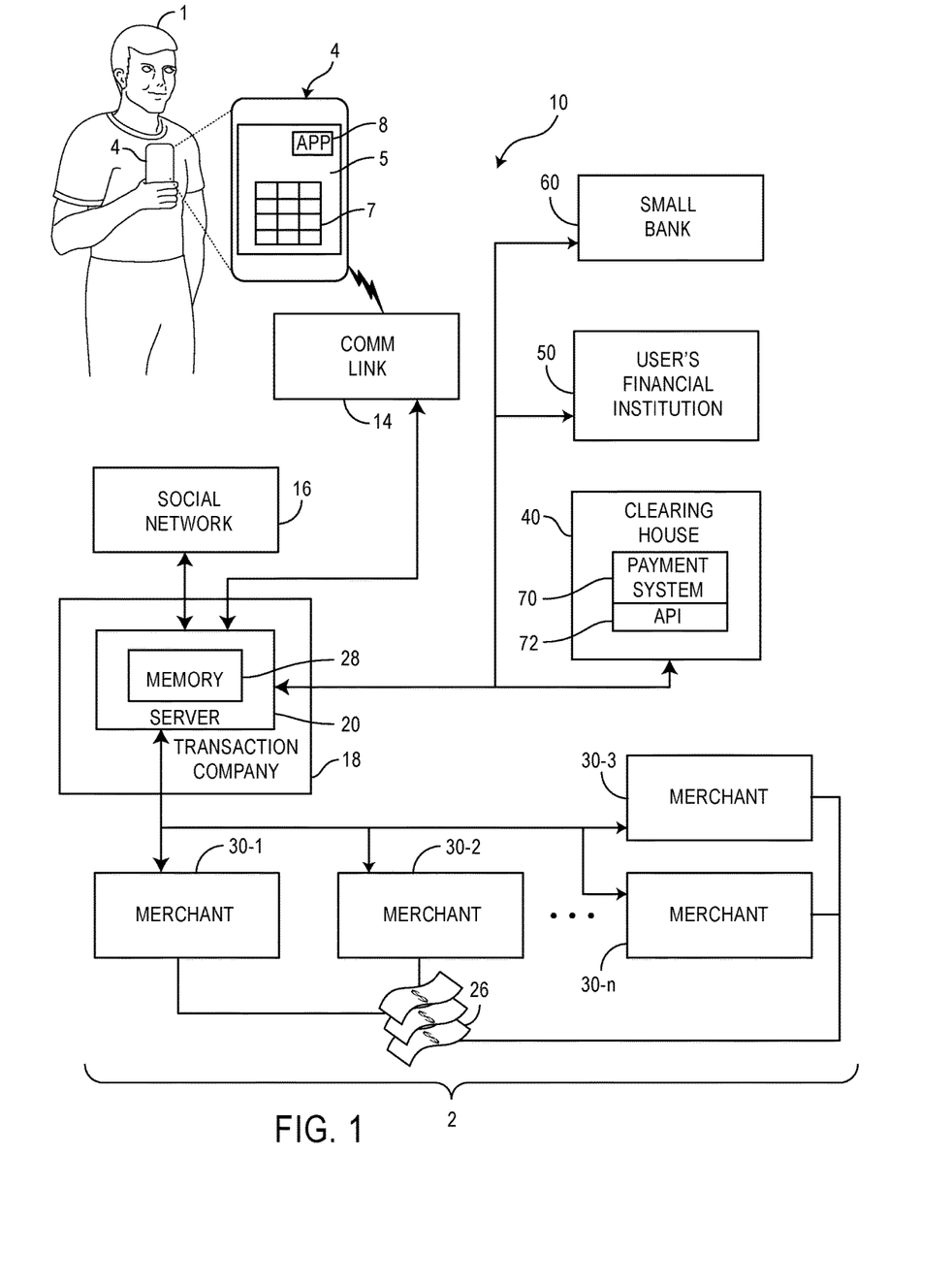
FIG. 1 is a block diagram of a communications network incorporating the present subject matter.
Figure 2:
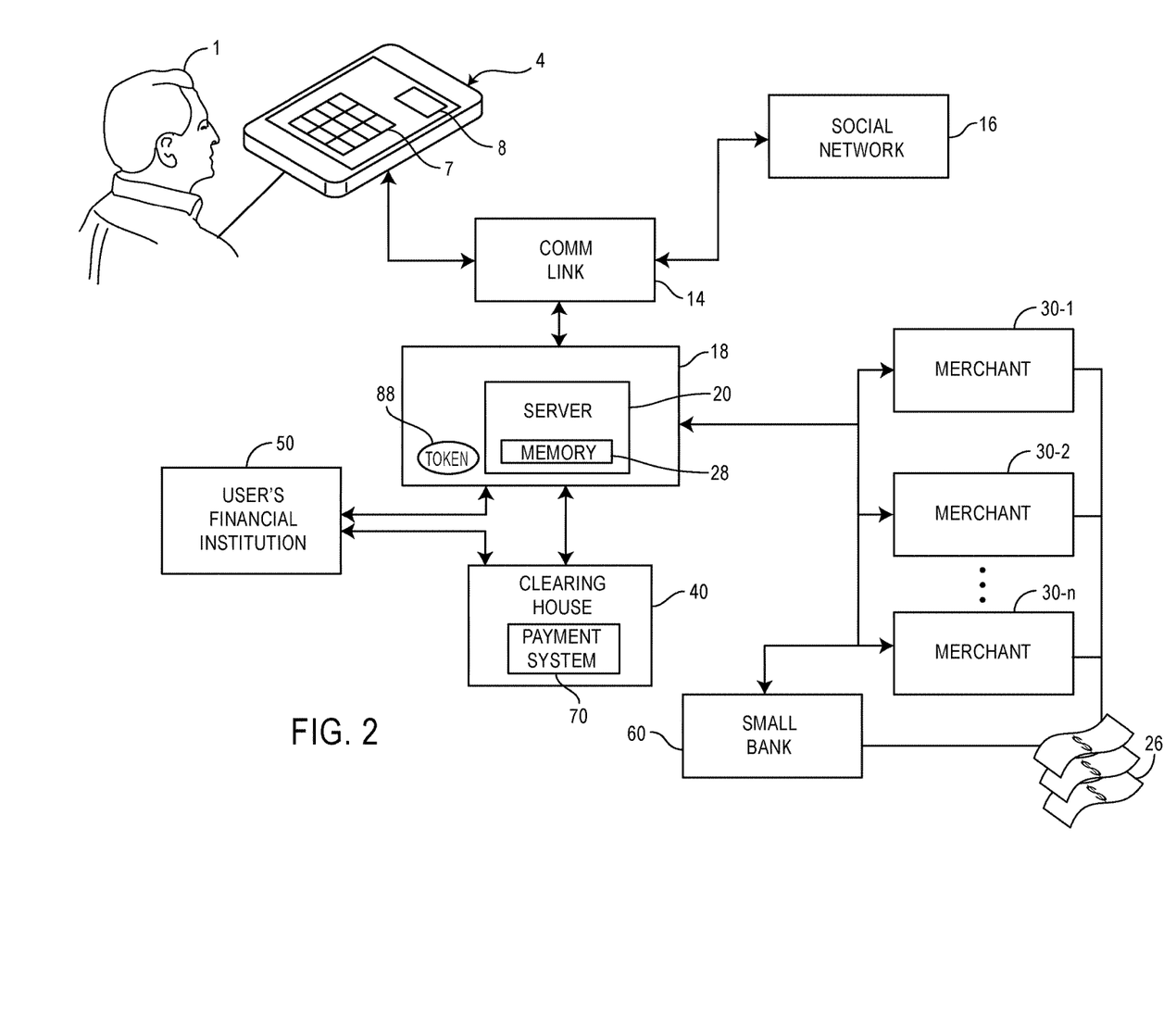
FIG. 2 is a diagram illustrating interactions in the present system.

FIG. 1 is a diagram illustrating hardware in the present system. FIG. 2 further describes interactions within the system of FIG. 1.

FIG. 1 is a block diagram of a communications network incorporating the present subject matter. A user 1 interacts with a communications network 10 in a system 2 in order to obtain cash. Interface with the communications network 10 is provided via a portable interactive device 4. Presently, the predominant form of portable interactive device 4 is a smartphone. However, other portable interactive devices 4 may be utilized. Other portable interactive devices 4 may comprise a tablet computer or devices that do not yet exist. In one preferred form, the portable interactive device 4 is coupled to communications network 10 by a communications link 14. A social network 16 may be used in the registration process and in the sign-in process.

The user 1 views a screen 5. To facilitate interaction a graphical user interface (GUI) 7 is displayed on the screen 5. Communication between the user 1 and the system 2 is enabled by an app 8 loaded in the portable interactive device 4. The app 8 enables the portable interactive device 4 to interact with components of the communications network 10 as further described below. The app 8 is written to enable the interactions.

In accordance with the present subject matter, communications paths are provided to make efficient use of computer resources. The structure of the system provides for increased speed and reduced cost of operation.

Operations are performed by a transaction company 18. The transaction company 18 sets the monetary model for the system 2, promotes the service, obtains subscribers, and directs financial transactions. In one preferred form, the transaction company 18 operates a server 20 and defines rules used by the server 20 to coordinate interaction between apparatus participating in the communications network 10. The transaction company 18 or a cooperating entity is proprietor of the app 8. The app 8 may be written and maintained by the transaction company 18 or by another entity preferably having an arrangement with the transaction company 18. The communications network 10 will enable the user 1 to obtain cash 26 from a selected one of a plurality of merchants collectively referred to as merchants 30. Cash 26 provided to the user 1 is debited from an account of the user 1 at a user financial institution 50.

The communications network 10 comprises merchants 30-1, 30-2, 30-3 . . . 30-n, where n is an integer. An unspecified individual merchant 30 is referred to as a merchant 30. For purposes of the present description, merchant 30 refers to a location that dispenses cash 26 within the confines of the present system. The merchant 30 need not necessarily comprise a retail establishment. The merchant 30 may take many different forms including a retail store or a hotel. A small bank 60 may participate in the communications network 10 and act as a merchant 30. For purposes of the present description, a small bank 60 is a bank, credit union, or other financial institution that does not maintain its own ATM system.

The clearinghouse 40 is a financial institution that provides clearing and settlement services for the entities interacting through the communications network 10. The clearinghouse 40 is PCI compliant. Functions of the clearinghouse 40 include fulfillment of cash requests from the user 1, monitoring resources available from merchant 30, crediting the account of a merchant 30, and charging the amount dispensed plus any fee to the account of the user 1.

In one form, the clearinghouse 40 is a payment system 70 such as PayPal, Stripe, or Dwolla. The payment system 70 cooperates with a financial institution such as a bank or credit union. The payment system 70 operates a software platform including an application program interface (API) 72 that communicates user instructions for funds transfers to the financial institution.

FIG. 2 illustrates communication paths providing interaction among the components described in FIG. 1. Prior to the first sign-in, the user 1 registers with the network 10 as described with respect to FIGS. 4 and 5. After registering with the system, the user 1 is enabled to sign in and be authenticated with the system in order to begin the process of obtaining cash.

In order to sign-in, the portable interactive device 4 sends sign-in data via the communications link 14 to the social network 16 used in the registration process. Sign-in data usually comprises a user name and a password. The social network 16 confirms the user 1's identity by checking the user name and the password. If the identity is confirmed, a confirmation is sent to the portable interactive device 4. The user 1 is prompted to enter a PIN which is read by the app 8.

The user 1 may register a plurality of accounts and select one of the accounts when seeking to withdraw cash. Once signed in, the user 1 communicates with the server 20 in order to communicate requests for processing by the server 20. When authorized by the app 8, the user 1 uses the GUI 7 to enter an amount desired to be withdrawn. The amount is sent via the GUI 7. The amount may be registered at the server 20. The server 20 communicates to the user financial institution 50 to request authorization and in return receives confirmation of the request and the user financial institution reports whether sufficient funds are in the account of user 1. At a separate time each merchant 30 communicates to the server 20 to inform its availability for participation and the amount of cash available at a particular time. A small bank 60 may report to the server 20 in the same manner as a merchant 30.

The transaction company 18 loads the server 20 with information on each merchant 30. After the server 20 compares the request from user 1 to stored data, a response is transmitted directly back to the user 1 as to whether the withdrawal is authorized and which merchants 30 meet the user 1's criteria. When the user 1 makes a selection of a merchant 30, the server 20 sends a message to the merchant 30 including transaction and authentication information. When the cash 26 is dispensed, the merchant 30 reports to the server 20. The server 20 informs the clearinghouse 40 and the clearinghouse 40 informs the user financial institution 50 and the server 20.

Figure 6:
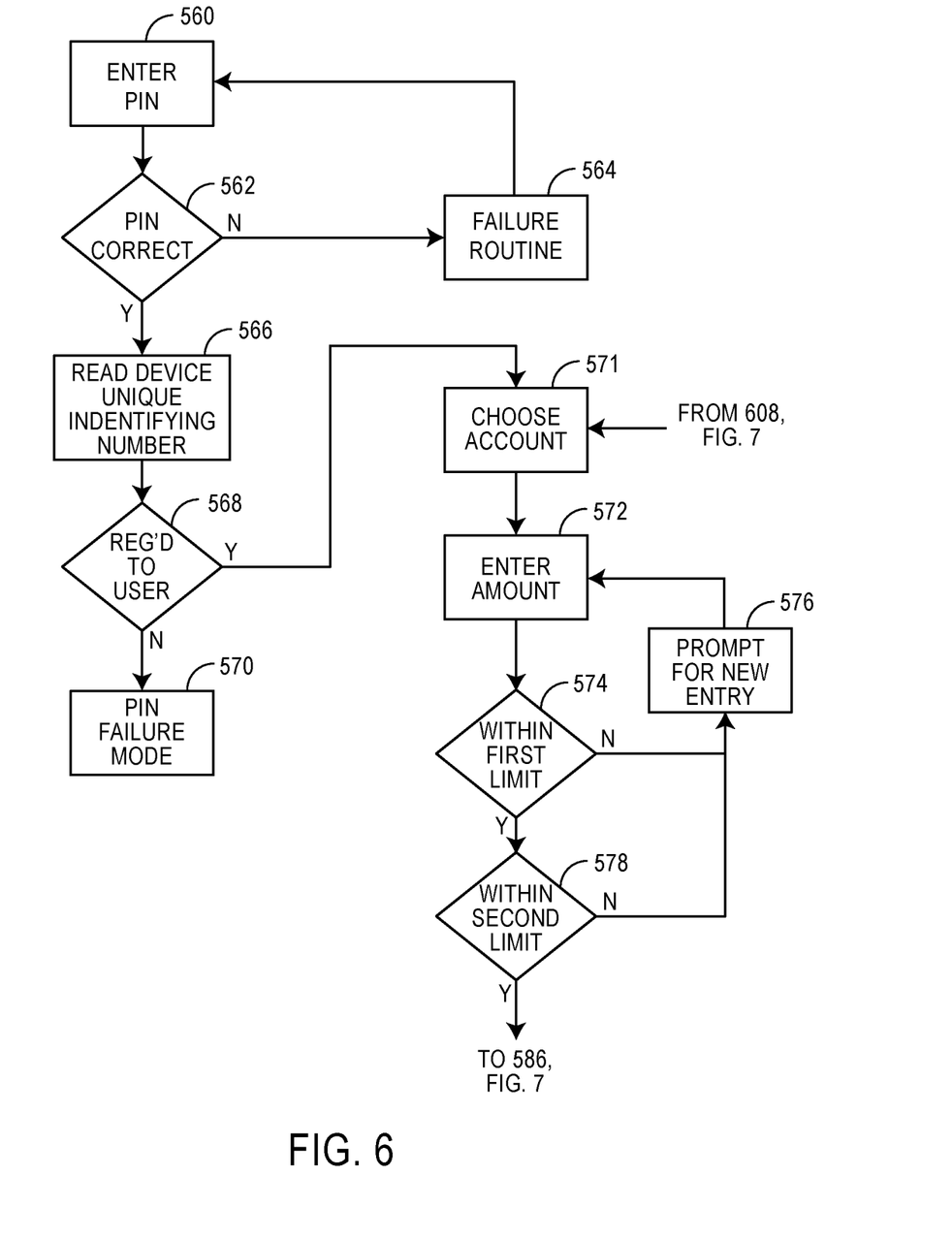
FIG. 6 is a flowchart illustrating initiation of a cash withdrawal transaction.

Unique identifying information associated with the user 1 is also provided from a user profile as described with respect to FIG. 6. In the simplest form, the unique identifying information is a photograph. Biometric information such as a fingerprint or retinal scan data could be used in addition or in the alternative.

Prior to participation in the network 10, each merchant 30 reports to the server 20, informing the system of its participation on a particular day and how much cash is available for dispensing to users 1. After a transaction is completed, the clearinghouse 40 receives transaction information, reports to the payment system 70, and informs participants of transaction results and current status.

The server 20 performs a routine to select an appropriate group of merchants to present to the user 1 so that the user 1 may select a preferred merchant 30. The user 1 provides a location to the server 20. The location may be a current location of the user 1 or a location where the user 1 will be at a later time. The user 1 may select a preferred type of merchant 30 such as a hotel or a retail store. Alternatively, the server 20 may select a plurality of choices to present to the user 1. The server 20 is provided with selected data fields relating to each merchant 30. Fields visible to the user 1 may include location, type of establishment, hours of the establishment, and services or products available at the establishment. Information in the fields is accessed from a memory 28 in the server 20. The server 20 will access the list of merchants along with their daily limits on cash that will be dispensed and limits on individual transactions if any. The amount of each withdrawal is subtracted from the daily limit for the merchant 30. A running balance of cash available at each merchant 30 is maintained. The server 20 will present to the user 1 only those merchants 30 having a current balance sufficient to meet the user 1's cash request.

The distance from each merchant 30 is calculated. The user 1 may limit criteria for merchants 30 to those within a preselected distance from the location provided by the user 1 to the system. The server 20 provides a selection of merchants 30 meeting specified criteria.

Additionally, the server 20 informs the user financial institution 50 of the user 1's identity and requests an authorization to dispense cash. The authorization will generally be dependent upon the user 1 having sufficient funds. The funds may be in any of a number of types of accounts. Most commonly, a withdrawal will be made against a checking account. Other types of accounts include credit cards, debit cards, savings accounts, or a digital wallet.

If the withdrawal is authorized, an approval token 88 is provided to authorize the user 1's transaction. In the preferred form, the approval token 88 is a one-time token. This is preferably done by providing a barcode 90 (FIG. 3B) to the app 8.

Figure 3A:
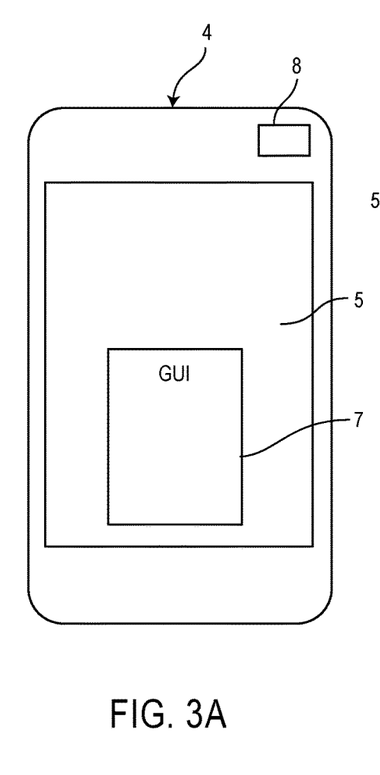
FIGS. 3A and 3B illustrate a graphical user interface screen at first and second times.
Figure 3B:
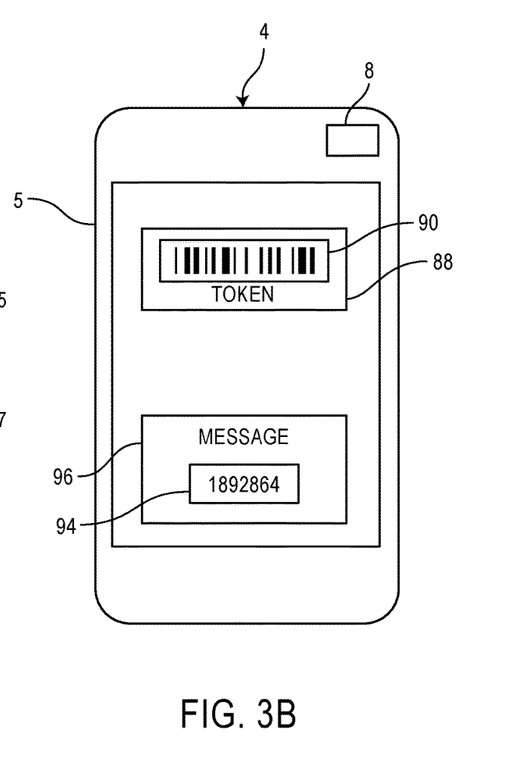

FIG. 3A illustrates the GUI 7 at a first time when the user 1 is enabled to make entries. FIG. 3B illustrates the screen 5 at a second time when the barcode 90 and transaction identification number 94 are shown on the screen 5. In order to identify the approved transaction, transaction identification is sent to the user 1. This is preferably done by texting an authorization number to the portable interactive device 4, shown on the display field 96 in FIG. 3B. Information is also sent to the selected merchant 30. The transaction identification number 94 and the approval barcode 90 are registered with the merchant 30 as well as identification of the user 1.

As seen in FIG. 2, the unique user identification stored in the user 1's profile is transmitted to the merchant 30. The profile is further discussed with respect to FIG. 4 below. The merchant 30 utilizes the system to match authentication information in the portable user device 4 to the transaction authentication information registered with the merchant 30. To identify the user 1, the merchant may look at the uploaded photograph and visually compare that photograph to the appearance of the user 1. The merchant 30 could also utilize a fingerprint scanner or a retina scanner.

When authentication is completed, the merchant 30 provides cash 26 to the user 1. The merchant 30 enters completion of the transaction. The transaction is then reported to the clearinghouse 40. The clearinghouse 40 informs the user financial institution 50 and arranges for settlement of accounts. The server 20 is also programmed to add appropriate fees to the transaction.

Figure 4:
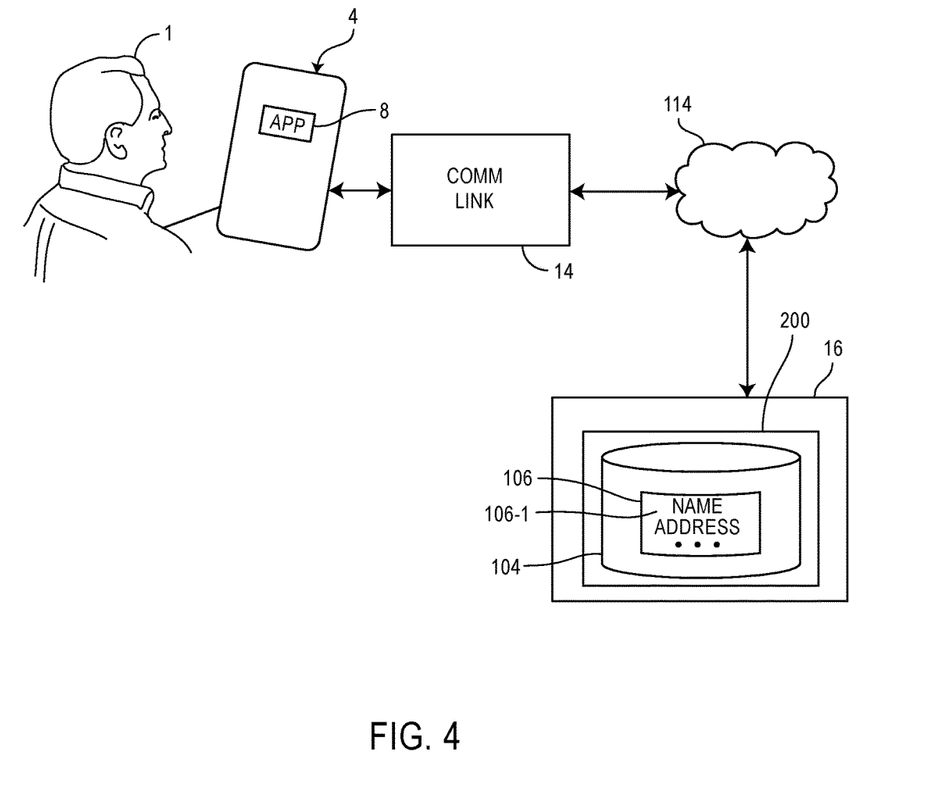
FIG. 4 is an illustration of one form of the registration process discussed further with respect to FIG. 5 below.

FIG. 4 is an illustration of one form of the registration process discussed further with respect to FIG. 5 below. The security system embodied in the present subject matter using a multifactor authentication approach is designed to protect the user 1, merchants 30, and the transaction company 18 from fraud while ensuring strict compliance with all regulations pertaining to card transactions, ecommerce, and money laundering statutes. Additionally, PCI compliance and KYC compliance are facilitated. Know your customer (KYC) is the process of a business verifying the identity of its clients.

When a user 1 registers for the app 8, a unique device identifying number is registered with the account. Whenever the user 1 logs onto the app 8, the unique device identifier is checked. Unique device identifiers may include CPU serial numbers or other specific identifier set. Preferably, a unique device identifier for a particular portable interactive device 4 comprises an identifier associated with the hardware device itself. Android devices use international mobile equipment identity (IMEI) and mobile equipment identifier (MEID) numbers. IMEI is a code used for both GSM and UTS telephones. MED identifies a physical piece of code division multiple access (CDMA) mobile station equipment and is a unique identifier for CDMA handsets in the United States. Apple systems utilizing iOS are identified by a unique device identifier (UDID). The merchant 30 may also register.

In a preferred form, only one device may be registered to an account at a time. If a user 1 logs on with a different device, the user 1 is taken to a secure process to register the device. When a device is registered, the user 1 is notified through e-mail and text to a previously registered device. Additionally, the app 8 generates a one-time barcode 90, also referred to as the token 88 above. A user name and password of the user 1 must be entered each time the user 1 logs into the app 8. A user name may be stored on most devices. In the preferred form, the password must be entered on each login.

In this arrangement, multiple levels of security are provided. Fraud by a user 1 is presented in any number of ways. An attempt by a user 1 to register using a lost card or stolen card would be unsuccessful because the app 8 will not allow transaction cards to be registered which are not in the name of the account. The requirement that an image or other biometric data be provided describing the user 1 will discourage fraudulent transactions. An unauthorized user might have possessed the portable interactive device 4 of user 1 but would still need the password. Even if the unauthorized user obtained the password, the physical identification of the user 1 would not match the unauthorized user.

The social network 16 cooperates in the process of authenticating the user 1 to the system. A purpose of social media registration is to provide assurance when the user 1 seeks to withdraw cash that the user 1 is the same person who initially registered with the system. The user 1 operates the portable interactive device 4 to communicate with the social network 16. The social network 16 maintains a profile database 104 which stores usernames and passwords in locations 106. A location 106-1 is dedicated to the user 1. The location 106-1 contains information such as name, address, telephone number, and email address of the user 1. The portable interactive device 4 may be coupled to the social network 16 by the communications link 14. The communications link 14 may include the Internet 114. As explained below with respect to FIG. 5, the app 8 and the social network 16, such as a social media website 200, cooperate to generate a PIN to provide an additional level of security in limiting use of the portable interactive device 4 to request cash to the user 1. It is recognized that impostors may create a set of interlocking accounts. However, as further described below, physical information indicative of the user 1 is also required for authorization. Consequently, some information about the impostor will be provided to the transaction company 18. Increased sophistication would be required of an impostor to defeat this level of additional security.

Figure 5:
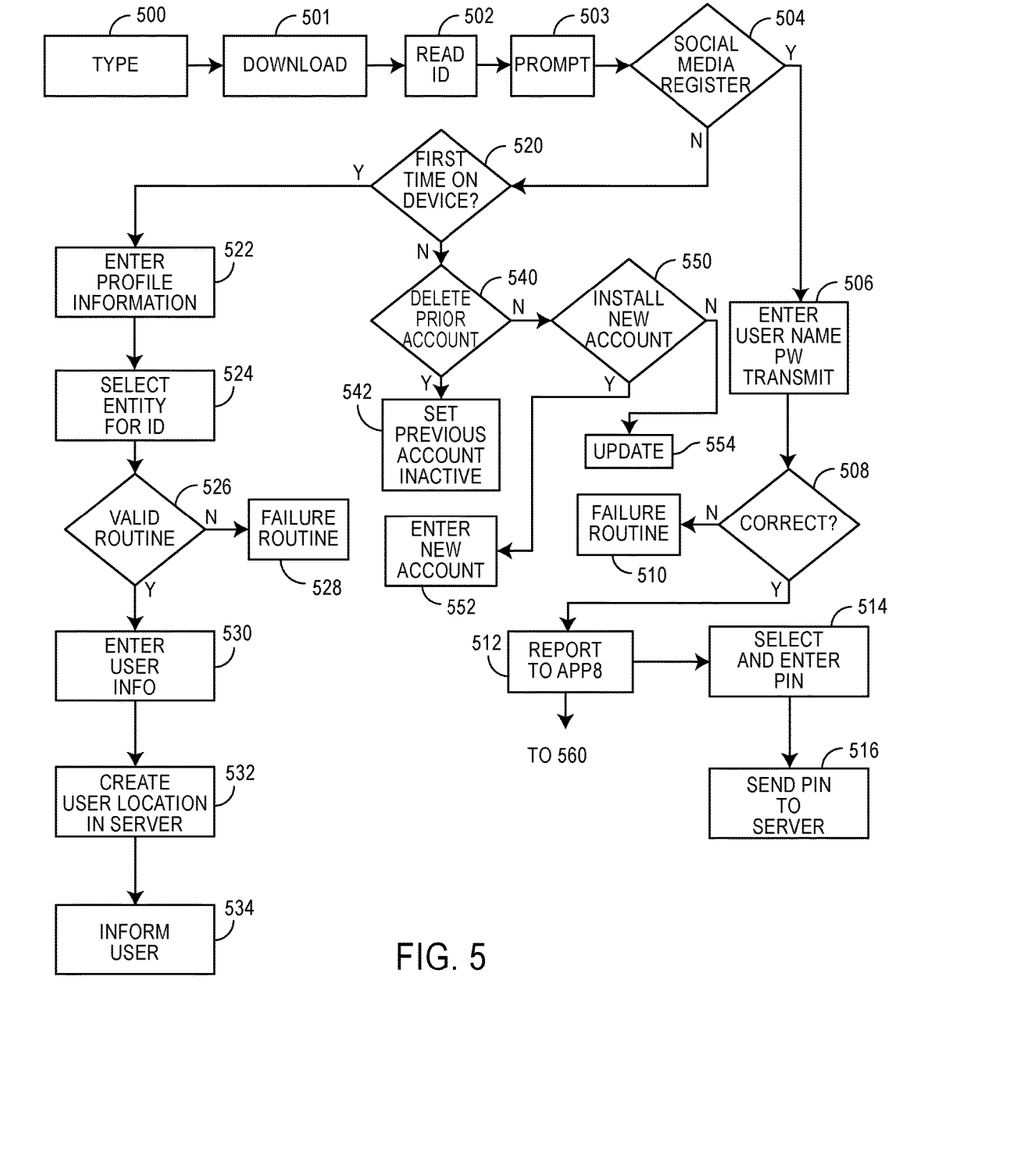
FIG. 5 is a flowchart illustrating provision of an app to a user or a merchant and registration with the system.

FIG. 5 is a flowchart illustrating registration of users 1 and merchants 30. At block 500 the registrant is prompted to enter type, e.g., user 1 or merchant 30. The app 8 is downloaded at block 501. Generally the app 8 is downloaded via a conventional app source. Predominant app sources include Google Play and the Apple Store. At block 502, the app 8 reads the unique device identifying number having a one-to-one correspondence with a particular portable interactive device 4. An example of the unique device identifying number is a serial number of a central processing unit (CPU) in the portable interactive device 4. The serial number is maintained as part of the user profile. More commonly hardware identifiers are used. Android devices use IMEI for both GSM and UTS telephones. MED is a unique identifier for CDMA handsets in the United States. Apple systems utilizing iOS are identified by a UDID. The step at block 502 need not be performed within a fixed order. Having the unique device identifying number available is required for the cash withdrawal process.

Also at block 503, the app 8 prompts the user to register. The app 8 may be programmed to suggest that the user 1 use the social media website 200 (FIG. 4) for logging in. The user 1 also has the option to register manually. At block 504, the user 1 selects whether to proceed to use the social media website 200. If social media website registration is selected, operation proceeds to block 506. Alternatively, the user 1 may proceed to block 520 to begin manual registration.

At block 506, the user 1 selects an existing social media website 200 and enters the user 1's or merchant 30's username and password. At block 508, the social media website 200 determines correctness of the username and password. If incorrect, operation proceeds to a failure routine at block 510. The failure routine may include the conventional responses to an incorrect password or username. These include allowing the user 1 to try again, allowing password recovery, or freezing an account after a preselected number of unsuccessful tries has been made. If the entry is successful, operation proceeds to block 512 and to block 514. At block 512, the social network reports to the app 8 that authentication was successful. The app 8 responds to the notification by prompting the user 1 to select and enter a PIN at block 514. The PIN is entered and is sent for storage in the user 1's location 106-1 in the server 20 at block 516. On subsequent uses of the app 8, the user 1 need only enter the PIN. An additional layer of protection is provided in that a user PIN must be used in order to begin interaction with the app 8 in addition to any password and username. At block 514 the app reports the user profile and identification information of the user 1 to the transaction company 18 (FIG. 2). This information will be available for use by a merchant 30 to allow the merchant 30 to authenticate a user 1. The identifying information may simply include the Facebook picture of the user 1 or may include other biometric information discussed above.

If the user 1 elects to perform manual registration, operation proceeds to block 520. The app 8 detects whether initial use of the app 8 is being made. If the initial use of app 8 is being made, manual registration begins at block 522. At block 522, the user 1 enters basic profile information such as name, email address, physical address, and telephone number. Next, at block 524, the user 1 selects an entity which provides some degree of identification of the user 1. The entity may be an email account, for example. The user 1 enters the username and password of the email account. The app 8 will cooperate with the server 20 to determine if a valid email account has been entered. If not, a failure routine is initiated at block 528.

If so, unique identifying information indicative of the user 1, such as physical information, is added at block 530. Most commonly, the unique identifying information will comprise a photograph. The app 8 will not accept an uploaded image. The user 1 must take a "selfie," i.e., a self-portrait, with a camera in the portable interactive device 4. Alternative or additional forms of identification may include digital representations of a fingerprint or a retinal scan. Once the user information is created, at block 532, the user information is sent to the location 106-1 (FIG. 4), and the user profile is created in a database located in the server 20. The user 1 is informed at block 534 by text or by email that the user account has been established.

Additionally, an option may be provided to proceed from block 520 to block 540 at which a user 1 may delete the previous account. If the user 1 decides to delete a prior account, operation proceeds to block 542 where the prior account is deleted. If an account is not being deleted, at block 550 the user 1 may elect to install a new account. A new account is installed at block 552. If a new account is not installed, the user 1 has the option to update profile information at block 554.

Additional security may be provided by correlating the extent of the privileges of the user 1 to the amounts of verifiable data and identification provided by the user 1. Preferably, the merchant 30 is investigated in the same manner that a bank would investigate a merchant 30 using the bank's credit card system.

FIG. 6 is a flowchart illustrating an initiation of a cash withdrawal transaction. At block 560, the user 1 enters a PIN. At block 562, the app 8 evaluates the entry. If the PIN is not correct, operation proceeds to a failure routine at block 564 at which the user 1 has the opportunity to respond to an incorrect login. If the PIN is found to be correct, operation proceeds to block 566. At block 566 the unique device identifying number of the portable interactive device 4 of the user 1 is read. At block 568 the unique device identifying number being read is compared to the unique device identifying number stored in the user 1's profile. If the stored and current unique device identifying numbers do not match, operation proceeds to a PIN failure mode at block 570. Options in the failure mode include giving the user 1 the opportunity to reregister the device at block 568 or locking the user 1 out of the system.

Many users 1 maintain more than one cash account. The user 1 may have one or more accounts registered in the server 20. This multiple registration permits the user 1 to select one of a plurality of accounts from which to withdraw cash. At block 571 the user 1 selects an account from which he chooses to obtain the cash 26. If the identity of the portable interactive device 4 is correct, operation proceeds to block 572. At block 572 an amount is entered which the user 1 wishes to obtain in cash at a merchant 30. In most cases, limits for withdrawals are established. The desired amount may be compared at block 574 to a first threshold level. Threshold levels defining maximum amounts that may be withdrawn are determined by the transaction company 18 and/or the user financial institution 50. Additionally, in one embodiment, the app 8 is programmed to limit each of the first three withdrawals to $40.00. After that, additional thresholds may be stored. The threshold may be established by a rule set in the app 8. A limit could be provided by the server 20 so that the transaction company 18 may limit its risk. If the requested amount is not within preset limits, operation proceeds to block 576 at which a user prompt is provided to direct the user to return to block 572 to enter a new number. Once an amount is typed at block 572 operation proceeds to block 574 in which a second threshold comparison is made. Operation then proceeds to block 578 where a second parameter of the transaction is compared to preset limits. The second parameter could comprise cumulative allowed withdrawal amount for a given time window such as one day or one week. Other numbers of parameters could be used. Once an approved second parameter has been entered, operation proceeds to block 586 in FIG. 7, where the user requests a comparison to be made of criteria to merchant data. The user's financial institution may also send information to the server 20 for use in determining limits. In this case, the order of operations is changed so that the comparison to threshold ranges follows a user 1's selection of a financial institution 50 in order that the user 1's financial institution 50 may provide limits prior to the user 1's setting an amount of its cash request.

Figure 7:
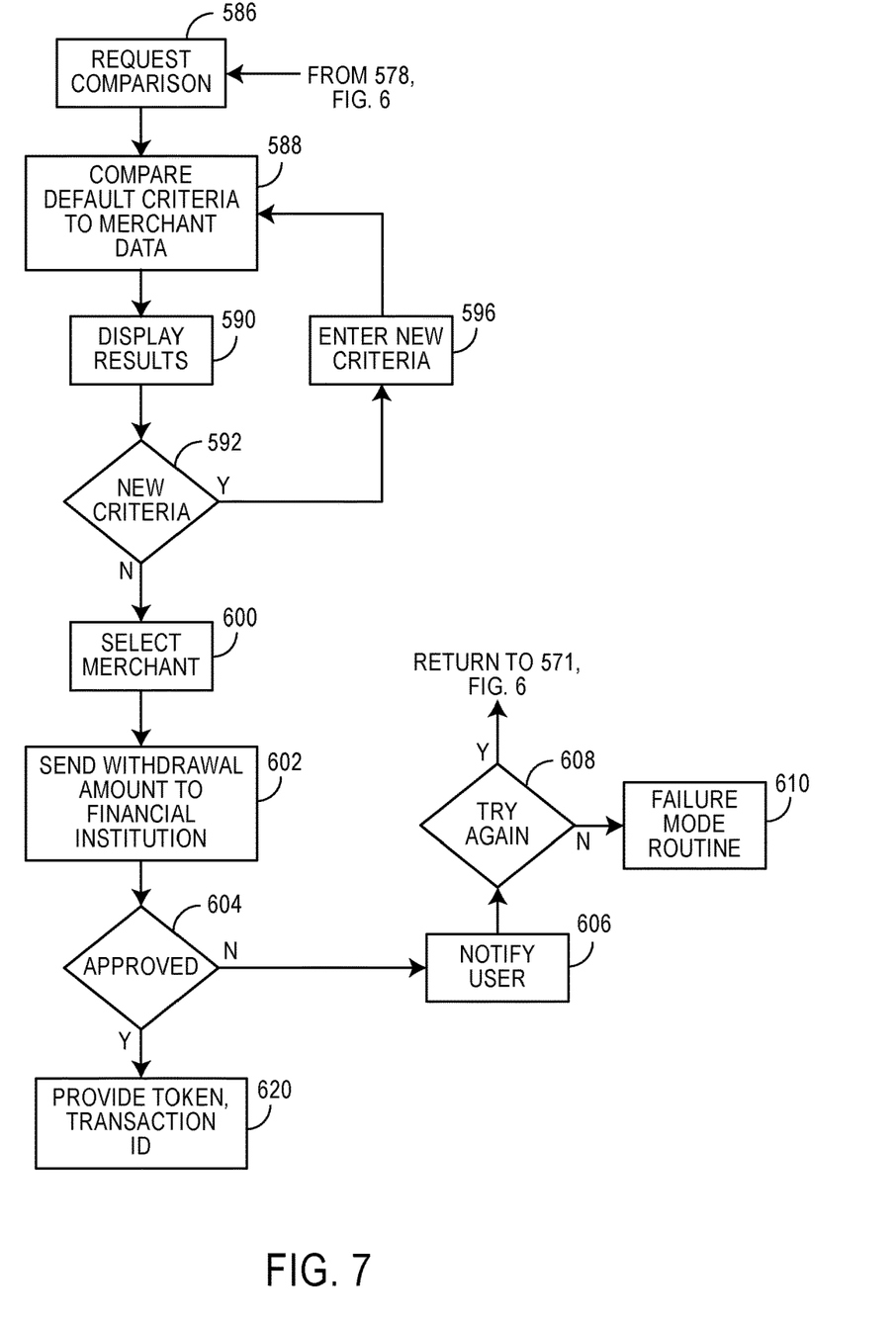
FIG. 7 is a flowchart illustrating selection of a merchant and authorization of a transaction via the communications network.

FIG. 7 is a flowchart illustrating the operation of the server 20 in response to the cash request by the user 1. At block 586 the user 1 requests a comparison to be made of criteria to merchant data. In the present illustration, one default criterion is set. The criterion is distance of each merchant 30 from the user 1. A location function, commonly available in portable interactive devices 4, is used to detect the location of the user 1 and transmit the location via the app 8 to the server 20. An alternative default criterion is whether a merchant 30 will deliver cash 26. Other additional criteria may be used at block 586. Having a default criterion facilitates ease in operation. However, it is not necessary to set a default. The comparison is made at block 588. The app 8 presents a set of default criteria on the screen 6 at block 588 indicating criteria used in the comparison. In one preferred embodiment, the criteria include a different distance from a current location of the user 1. Other criteria may include type of merchant, such as a grocery store or souvenir shop.

At block 590 merchants 30 meeting the current criteria are displayed on the screen 5. At block 592 the user 1 may accept or reject the results identified at block 590. If the user 1 elects to change the criteria, operation proceeds to block 596 where additional or changed criteria are entered. At block 596, the user 1 may select these different criteria. One criterion may include distance from the user 1. Another criterion may be type of establishment, such as a restaurant or hotel. Operation then returns to block 588 for a next comparison of merchants 30 to selected criteria. Results of this next comparison are displayed at block 590 on screen 5. Operation again proceeds to block 592. If the user 1 accepts current criteria, operation proceeds to block 600. At block 600 the user 1 selects one merchant 30 displayed on the screen 5.

At block 602 the requested transaction is sent to a financial institution from which funds are to be withdrawn. At block 604 the financial institution uses its criteria for transaction approval as to whether it is approved or declined. A declined transaction is reported to the user 1 at block 606. At block 608, the user 1 may elect to return to block 571 or block 572 in FIG. 6 and select a different account for processing of the transaction or a different amount for the transaction. Alternatively, the user 1 may proceed to block 610 where the server 20 performs the failure mode routine.

If the transaction is approved, the token 88 (FIG. 3B) is created at block 620. The server 20 includes a one-time use authorization data field, e.g., a token PIN. The token 88 also contains the user's name and the amount of cash to be dispensed. The server 20 may receive the token 88 from the clearinghouse 40 (FIG. 1). Alternatively, the server 20 may create the token 88. The user 1 then confirms it will proceed with the transaction. For further security, a picture of the user 1 is taken when the user 1 confirms it will complete the transaction. The merchant 30 has the option to refuse to proceed. In another form, the transaction may proceed automatically. The server 20 retrieves money from the user 1's account.

The retrieved money is held in escrow by the transaction company 18. The escrow is released upon fulfillment of a condition. If the transaction is not verified by the merchant 30 as described below, the escrow is released back to the clearinghouse 40. If the transaction is verified, the escrow is released to the merchant 30. The merchant 30 is now holding the money for the user 1.

A unique code indicative of the token 88 is displayed by the app 8 on the portable device 4. The server 20 creates an authorization. The merchant 30 has the option to refuse to perform the transaction. In one preferred form, authorization information comprises a unique transaction number. The unique transaction number is texted to the portable interactive device 4. Additionally, the unique barcode 90, such as a 3-D barcode, is provided to the user 1 for display on the screen 5. The user 1 will present this information to the merchant 30 as described with respect to FIG. 8.

Figure 8:
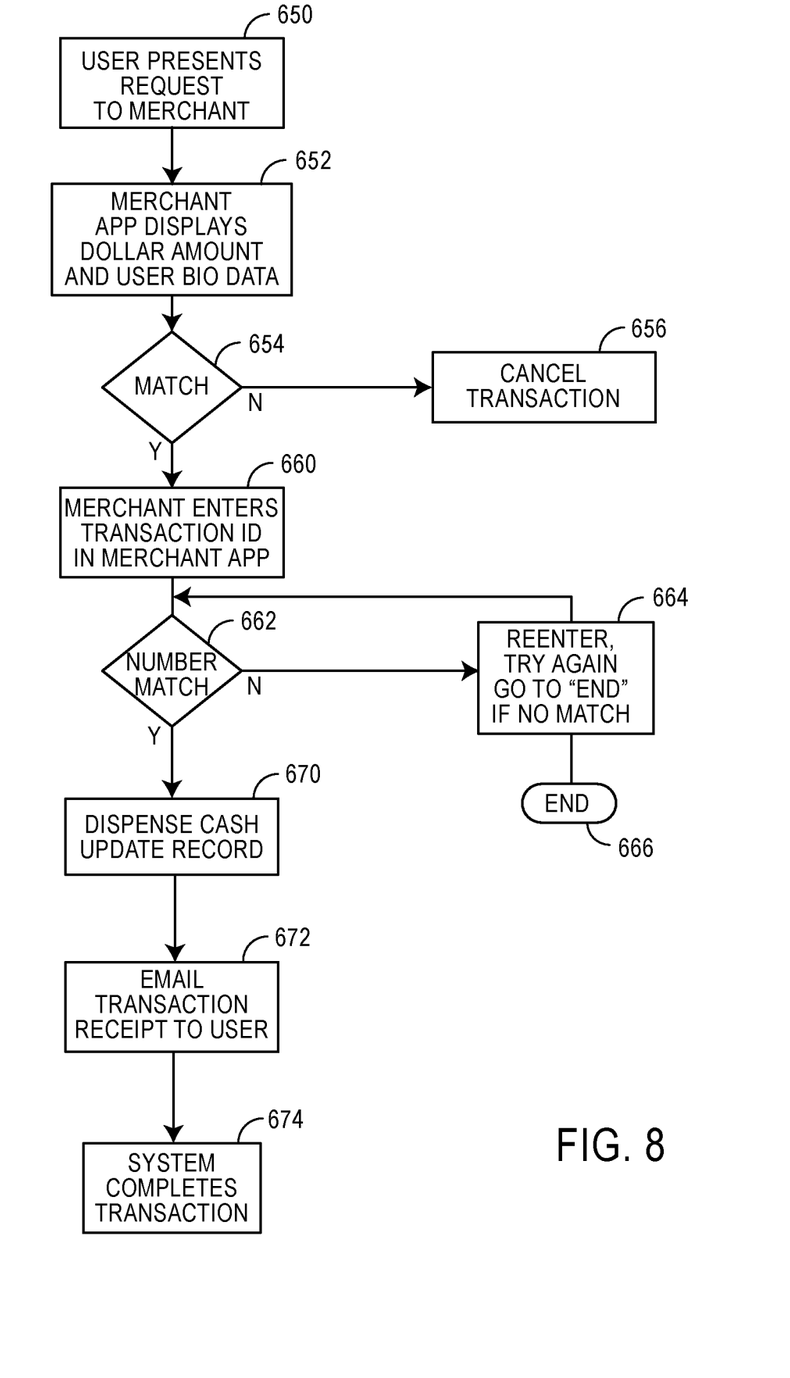
FIG. 8 is a flowchart illustrating the merchant transaction within the communications system.

FIG. 8 is a flowchart illustrating the transaction at a merchant 30's premises. At block 650 the user 1 presents authorization information to the merchant 30 including the transaction identification number. At block 652, the merchant receives transaction information and identification information from the server 20, but does not receive the barcode 90 from the server 20. At block 654, the merchant examines the personal identification information of the user 1. For example, the merchant 30 looks at a photo of the user 1 provided from the server 20 and compares it to the user 1 in person. If there is no match, operation proceeds to block 656 at which the transaction may be canceled and the user 1 may be told to contact customer support of the transaction company 18.

At block 660, the merchant requests identification data including token 88 from the user 1. Information may be exchanged from the user 1 to the merchant 30 in a number of ways. The token PIN is validated on the merchant's device. One convenient way is the use of near-field communication in which a merchant device can read authorization information from the screen 5 of the portable interactive device 4. Authorization information from the user 1 is compared to authorization information received from the server 20 at block 662. If there is not a match, checking of the information may be performed at block 664. The transaction number is reentered. The reentered transaction number is again compared at block 662. If the transaction number is still incorrect, then the transaction ends at block 666.

In response to a match, the merchant dispenses cash at block 670. The transaction record is updated. Updates include informing the server 20 of the remaining balance which the merchant 30 is willing to dispense within the preselected time period. At block 672, the server 20 creates an email in which the user 1 is provided with the transaction receipt. At block 674, the transaction is sent to the clearinghouse 40 at which the user 1's financial institution 50 debits the account from which money has been withdrawn. Additionally, the server 20 registers the amount dispensed by the merchant. The server 20 may order the clearinghouse 40 to pay the merchant 30 or may instruct the transaction company 18 to pay the merchant 30.

After the server 20 validates the transaction, the server 20 sends a message to the merchant 30 asking if the merchant 30 has dispensed the money. The server 20 also sends a message to the user 1 asking if the user 1 has received the money. If the answers are inconsistent, the server 20 informs the transaction company 18. The transaction company 18 may follow a conventional bank protocol to investigate and resolve the inconsistency. The transaction is performed on a non-ATM system and is still KYC compliant.

The merchant 30 is reimbursed by the clearinghouse 40 for the cash that has been dispensed. The merchant 30 may also receive a flat fee or a commission depending on the financial model used by the transaction company 18.

Figure 9:
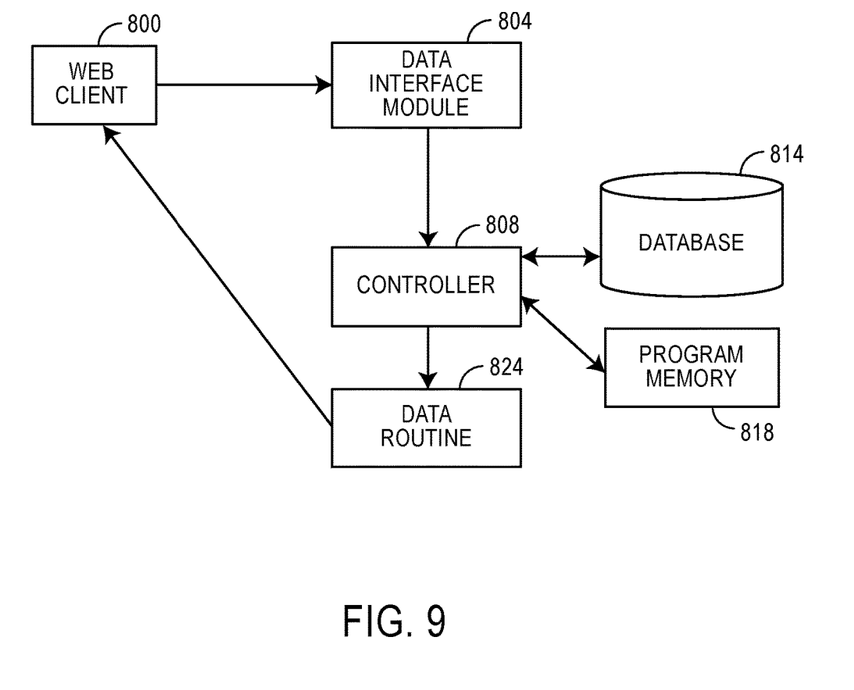
FIG. 9 is a chart illustrating the architecture of the app.

FIG. 9 is a chart illustrating architecture of the app 8. A web client 800 coordinates assigning operations to the server 20 in the communications network 10 and assigning operations within the app 8. A data interface module 804 receives input data from the user 1 and the communications network 10. Data is acted upon by a controller 808 after which data in the app 8 is stored in a database 814. Operations are performed in accordance with instructions in a program memory 818. Processed data is packaged by a data routine 824 and communicated to the web client 800.

FIG. 10 is an illustration of displays on a user's portable interactive device 4 in a representative embodiment of the present subject matter. In FIG. 10A, a user sign-in screen is illustrated. The user 1 may enter sign-in information in a field 900. In response to a successful sign-in, the user 1 proceeds to screen 10B at which the option is provided to update an account at field 902 or to enter a cash request at field 904. FIG. 10C illustrates a map at field 906 in which the user 1's location 908 may be entered. A field 910 provides the user 1 the opportunity to enter a desired amount of cash to be withdrawn. The field 910 may provide a plurality of fixed amounts from which to choose or allow the user 1 to enter a desired amount.

Figure 10A:
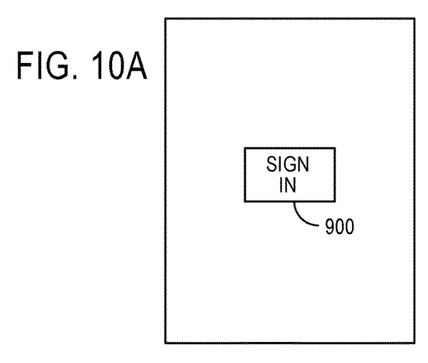
FIGS. 10A through 10F are each an illustration of a display on a user's portable interactive device in a representative embodiment of the present subject matter.
Figure 10B:
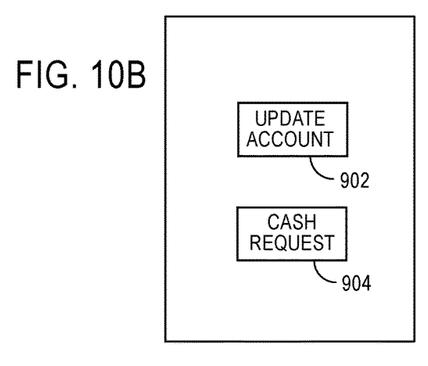
Figure 10C:
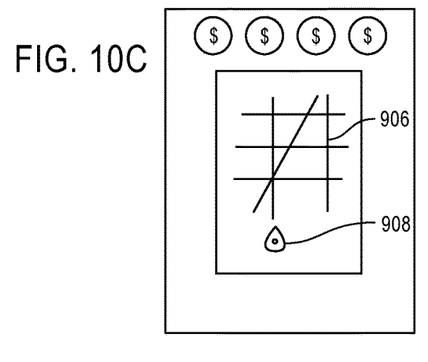
Figure 10D:
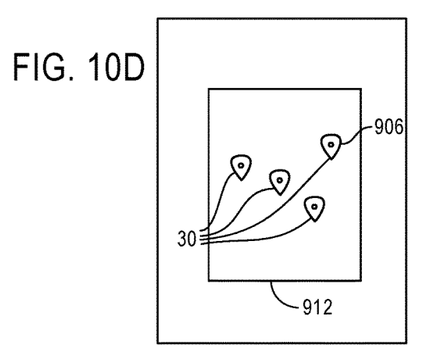
Figure 10E:
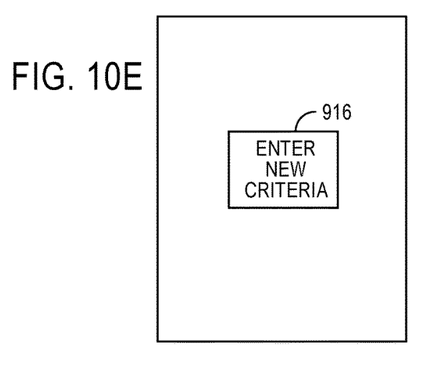
Figure 10F:
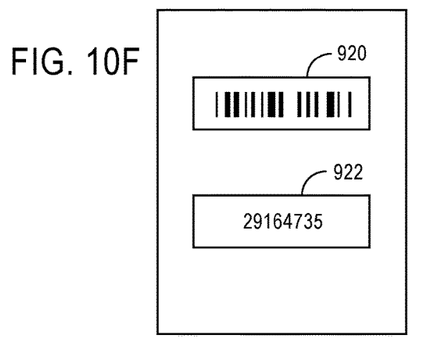

The app 8 compares the user 1's request to criteria, which may be default criteria, and displays results of matching merchants in field 912. The field 912 may comprise icons superimposed on the map 906 with links to data describing each merchant 30. In the alternative, lists or other information may be provided. The user 1 selects a merchant 30 or enters a prompt to access a screen 916 in FIG. 10E. The user 1 may enter alternative criteria or additional criteria in field 916. A new display of merchants 30 is provided on a screen also illustrated by FIG. 10D. The user 1 may select a merchant 30 from the new display. When the transaction is enabled, the token 88 is provided in a field 920 as seen in FIG. 10F. Additionally, a text message may be provided with a transaction identification number which could be displayed in a field 922 on the same screen or which could be seen within a message function on the portable interactive device 4. By sending the token 88 and the transaction identification number by diverse media, security is maintained. Even if one of the authenticating items is intercepted, an unauthorized user is not enabled to utilize authorization information.

Figure 11A:
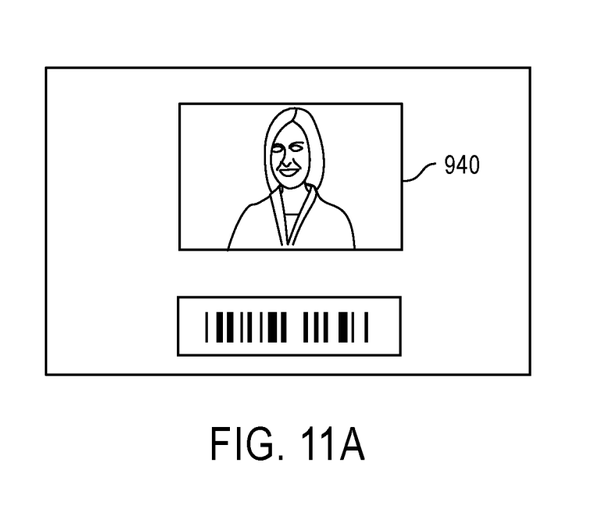
FIGS. 11A and 11B illustrate screens used by the merchant.

FIG. 11 illustrates screens used by the merchant. In FIG. 11A, a field 940 displays physical identification data of the user 1. Most commonly, the field 940 will display a photograph of the user 1. Alternatively or additionally, the field 940 may include a display that indicates that other data, such as a fingerprint, retina scan, or voiceprint has been transmitted to the merchant device. The merchant measures corresponding physical information by use of appropriate sensing devices. The physical information is compared to the transmitted physical information. Comparison of transmitted data to the user 1 may be achieved by the merchant 30 looking at the user 1 and judging if a photograph appears to represent the user 1. Alternatively or additionally, the merchant 30 may use biometric measuring devices and compare resulting data to the data transmitted from the portable interactive device 4. The transaction identification number may be displayed on the same screen in FIG. 11A or in another view.

Figure 11B:
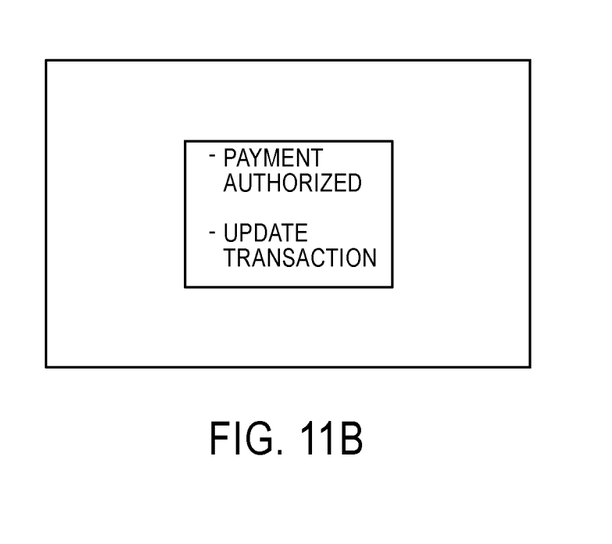

The transaction number from the portable interactive device 4 is transmitted to the merchant device. One convenient manner of transmitting the data is near-field communication in which the screen 5 of the portable interactive device 4 is placed facing the screen of the merchant device. If the data on the portable interactive device 4 matches the data transmitted to the merchant 30, as seen at screen 11B, the merchant 30 is advised that payment to the user 1 is authorized.

The present subject matter provides additional convenience compared to the prior art. Fewer steps are required to complete a transaction. Greater utility is provided from currently existing computer resources.

It is important to realize that steps in the computer program and subject method need not necessarily be performed in the order recited. For example, an authorization for an amount to be withdrawn could be performed before or after the user 1 selects a merchant location. Many variations may be provided in accordance with the teachings herein. Further, future technical developments in hardware and software will enable performance in accordance with the present teachings despite the fact that the instrumentalities through which the objectives are achieved may differ.

The invention claimed is:

1. A machine-readable non-transitory medium comprising one or more instructions that when executed on a processor causes the processor to perform the steps of:
receiving a user authentication credential entered by the user at a first location at a first time in a portable interactive device by a user;
transmitting the user authentication credential to a server having a stored instance of the user identification credential for comparison with the user authentication credential entered by the user and providing an authentication signal to the non-transitory medium in response to a match of the authentication credential entered by the user and the stored instance;
in response to an authentication signal from the server enabling the user to enter a cash withdrawal routine;
transmitting data to the server indicative of physical identification of the user;
prompting a user to enter a request for an amount of cash desired to be withdrawn;
transmitting user data to a server to enable the server to provide information to a financial institution to query whether an account of the user contains sufficient funds;
generating a one-time token in response to approval by the financial institution indicative of sufficient funds, receiving an authorization token in the server;
and presenting a cash-dispensing location remote from the first location at a second location with the request and providing to the cash-dispensing location an indication of the token authorizing the cash-dispensing location to dispense cash to the user and storing the indication for use by the cash-dispensing location at a second time.

2. A machine-readable non-transitory medium according to claim 1 further comprising an instruction such that a device identification number of the portable interactive device is transferred for comparison in the server to a stored instance of the stored device identification number indicative of the portable interactive device, and enabling further steps in response to a match.

3. A machine-readable non-transitory medium according to claim 2 further comprising an instruction enabling the user to begin the cash withdrawal routine at the first time in response to a match of the device identification number transmitted by the user to the stored instance.

4. A machine-readable non-transitory medium according to claim 3, the instructions further to cause creation of a transaction identification number in response to authorization from the financial institution and receiving a transaction identification number indicative of authorization transmitted from the server.

5. A machine-readable non-transitory medium according to claim 4, the instructions further causing presentation to a user of values of criteria common to cash-dispensing locations and further to cause a prompt to enable the user to select one of the plurality of cash-dispensing locations.

6. A machine-readable non-transitory medium according to claim 5, the instructions further to cause the portable interactive device to transmit authentication identification of a transaction to the cash-dispensing location.

7. A machine-readable non-transitory medium according to claim 6, the instructions further to cause the portable interactive device to command the server to transmit stored user information.

8. A machine-readable non-transitory medium according to claim 1 further comprising one or more instructions that when executed on a processor causes the processor to first perform the steps of registering a user wherein the steps of registering comprise:
loading the non-transitory medium into the portable interactive device prior to the first time;
detecting a device identification number of the portable interactive device in which the non-transitory medium is installed;
receiving a username and password entered by the user and verifying that the user name and password match an existing online identity of the user;

prompting the user to enter a user personal identification number and storing the user personal identification number; and transmitting the user personal identification number to the server.

9. A machine-readable non-transitory medium according to claim 8, the instructions further to cause prompting a user to enter user application profile information and transmitting the user profile information to the server.

10. A machine-readable non-transitory medium according to claim 9 the instructions further prompting the user to enter user physical identification information and transmitting user physical identification information to the server.

11. A machine-readable non-transitory medium according to claim 1 further comprising instructions such that a cash-dispensing location receives an input of an approved cash dispensing request.

12. A machine-readable non-transitory medium according to claim 11 further comprising instructions such that a cash-dispensing location device reads transaction authorization from the portable interactive device.

13. A machine-readable non-transitory medium according to claim 12 further comprising instructions such that the cash-dispensing location is enabled to compare user physical identification information provided by the user to data indicative of user physical identification information stored in the server.

14. A method for operating a portable interactive device securely in cooperation with an online money transfer system comprising the steps of:

providing the portable interactive device, the portable interactive device having a user interface;

entering a user personal identification number in the portable interactive device and transmitting the user personal identification number to a server to detect presence or absence of a match with a second instance of the user personal identification number stored in the server;

transmitting user physical identification information to the server;

prompting a user to enter a request for an amount of cash to be dispensed by a cash-dispensing location;

in response to approval by a user financial institution, notifying the user and a cash-dispensing location selected by the user;

providing to a user at an interface, information indicative of values of a common set of criteria for a plurality of cash-dispensing locations and enabling selection of a cash-dispensing location by the user to identify a selected cash-dispensing location;

presenting transaction authorization information from the user a selected cash-dispensing location for determination of a match with information stored in the server;

presenting user physical identification information from the user to the selected cash-dispensing location for determining a match with user physical identification information stored in the server; and authorizing the selected cash-dispensing location to dispense cash to the user in response to a match of the transaction authorization information and a match of the user physical identification information.

15. A method according to claim 14 further comprising the step of comparing a device identification number of a portable interactive device to a stored instance of the device identification number and enable further steps in response to a match.

16. A method according to claim 15 wherein the step of enabling comprises enabling the user to enter a request for cash.

17. A method according to claim 16 further comprising the step of creating a token for use in the server in response to approval of a request for cash by a user financial institution and transmitting to the user an indicator of the token by a first transmission medium and sending to the user a transaction identification number via a second transmission medium.

18. A method according to claim 14 further comprising the initial steps of prompting the user to enter a username and password of an authenticating site;

transmitting the username and password to the authenticating site;

receiving and reading in response from the authenticating site, the response comprising an authentication signal in response to a match of the username and password transmitted to the authenticating site and the username and password stored at the authenticating site;

in response to an authentication signal, prompting a user to enter a user personal identification number; and transmitting the user personal identification number for storage by the server.

19. A method according to claim 14 further comprising an initial step of establishing a merchant cash-dispensing location profile comprising merchant location and cash-dispensing location data.

20. A method according to claim 19 further comprising the step of reading the user authentication data by a cash-dispensing location device and reading the user physical identification information by the cash-dispensing location as an element of permitting dispensing of cash to the user.

* * * * *